United States Patent Office 3,399,578
Patented Sept. 3, 1968

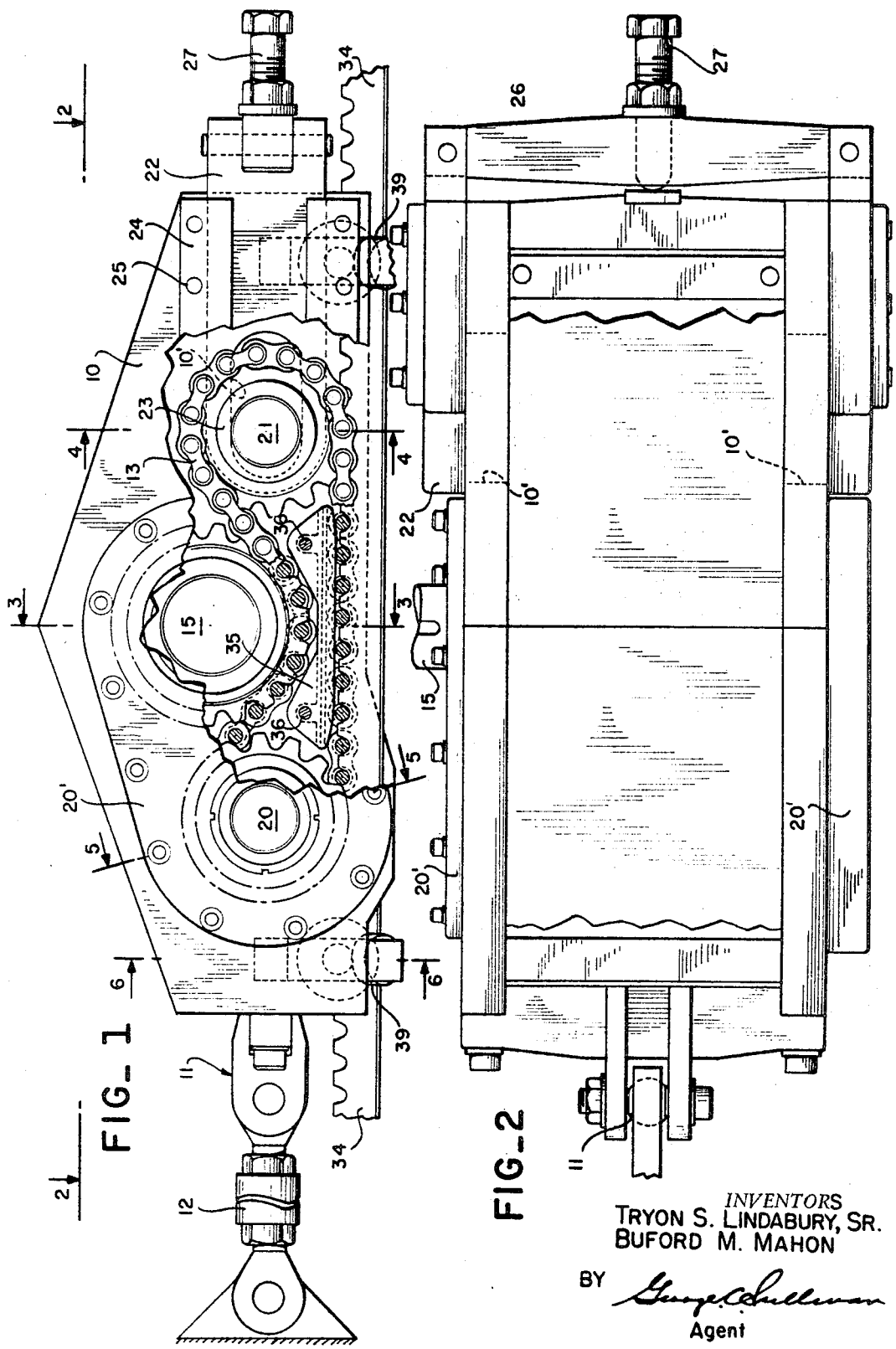

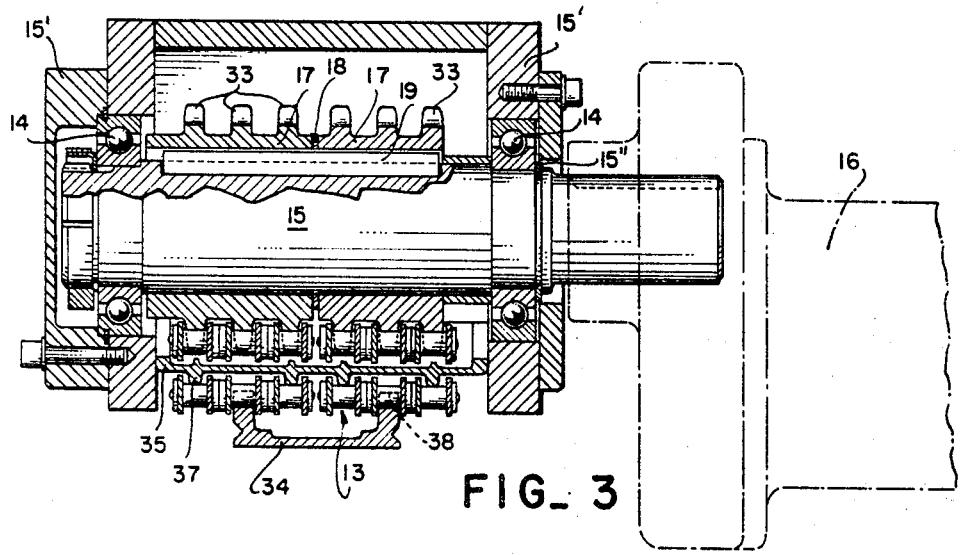
FIG_3
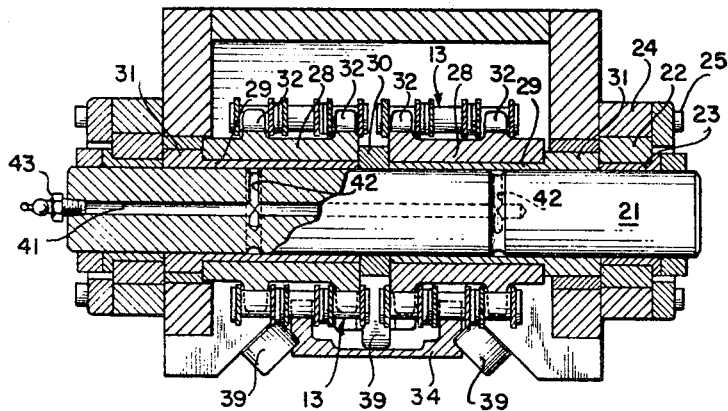
FIG_4

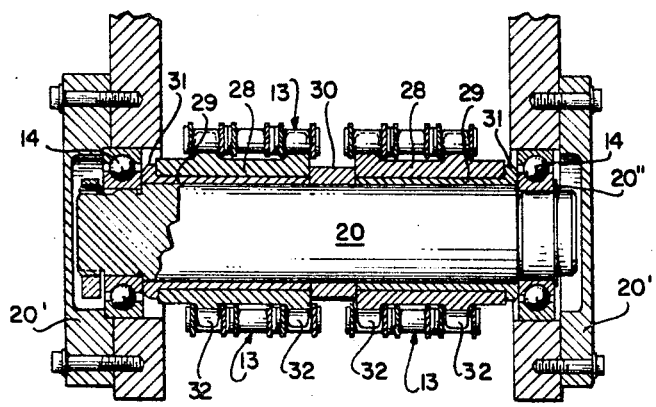
FIG_5
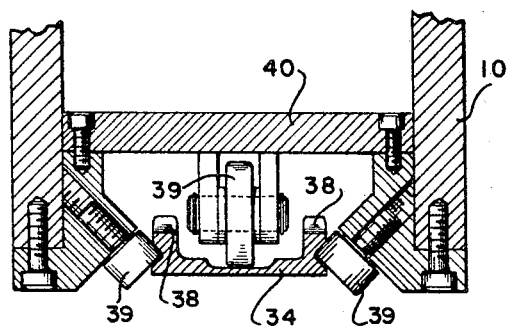
FIG_6

3,399,578
POWER TRANSMISSION MECHANISM
Tryon S. Lindabury, Sr., Marietta, Ga., and Buford M. Mahon, Columbus, Ohio, assignors to Lockheed Aircraft Corporation, Burbank, Calif.
Filed Sept. 19, 1966, Ser. No. 580,265
10 Claims. (Cl. 74—89.21)

ABSTRACT OF THE DISCLOSURE

A tractor-like actuator propels a toothed rack relative to the actuator by a multi-strand roller chain engaging the rack and driven by actuator sprockets. The rack may be straight or curved (external or internal) and has roller guides positioning the roller-supported actuator relative to the rack. Odd numbered chain strands are used, alternately engaging the rack and rolling on actuator guide shoes. For example, a triple stranded chain pin has one roller engaging the rack and two rollers rolling on guides, thus holding the rack roller into toothed engagement. Tooth load sharing derived by multiple engagement permits lightweight rack design.

---

This invention relates to power transmission mechanisms whereby a motion transfer occurs between rotary and linear devices and more particularly to such a mechanism incorporating coacting elements so organized and arranged as to effect a positive engagement at all times between one of the devices which is relatively stationary and the other device which is relatively movable for the efficient transfer of motion without unduly restricting relative movement therebetween.

In mechanisms designed to transfer power from a rotary device to a linear device and vice versa, it is desirable that no motion, and therefore, power loss occur across the connection effected by the mechanism. At the same time, the individual and different movement of each member associated with the rotary and the linear device respectively must not be substantially affected. As the amount of power being transmitted increases, which is determined by the load carried or to be moved by the driven member, this transfer efficiency of the mechanism becomes more difficult to maintain.

The present invention is primarily directed to improvements in the coacting engagement elements of the power transfer mechanism by which the drive and driven members are interconnected. These elements are especially designed and adapted to distribute the loads therein over a relatively wide area to give stability to the driven member during its movement with respect to the drive member. At the same time, the mechanism includes means to interconnect the members for relative universal movement to permit lateral excursions of the driven member during its movement relative to the drive member.

As a result of the foregoing features of the power transmission mechanism herein proposed, it has particular utility in, although not limited to, the transfer of motion to large bodies or masses for the movement thereof. In such applications, this mechanism offers a comparatively uncomplicated and reliable connector between the relatively stationary and relatively movable members for the efficient conversion and transfer of motion therebetween.

To the above ends, the instant mechanism comprises a carrier mounting an endless chain formed by multiple strands of rollers adapted to be driven by a powered sprocket train. At one end, the carrier is universally or swivelly connectable to one of the members, and a shoe associated with the carrier acts on and against the roller chain to maintain it at all times in the plane of, for coacting engagement with, the teeth of a rack secured to the other member. The teeth of the several sprockets and rack are alternatively arranged for engagement with the chain rollers whereby a symmetrical driving pattern results.

Thus mounted, the carrier interconnects the relatively movable and relatively stationary members at all times. Due to the swivel connection, however, these members are capable of predetermined lateral relative movement permitting excursions of the movable member about the path established by the rack while being driven through the coaction of the roller chain therealong.

With the above and other objects in view as will be apparent, this invention consists in the construction, combination and arrangement of parts all as hereinafter more fully described, claimed, and illustrated in the accompanying drawings wherein:

FIGURE 1 is a side elevation with parts broken away of a power transmission mechanism constructed in accordance with the teachings hereof and showing the mechanism with its roller chain in engagement with an associated rack;

FIGURE 2 is a view taken along line 2—2 of FIGURE 1 to show a plan elevation of the mechanism with parts broken away;

FIGURE 3 is a section taken along line 3—3 of FIGURE 1 to show primarily the power drive connection to the sprocket train and the engagement of the associated drive sprockets with the roller chain which in turn engages the adjacent rack;

FIGURE 4 is a section taken along line 4—4 of FIGURE 1 to show primarily one set of the idler sprockets in the sprocket train and the engagement thereof with the roller chain which in turn engages the adjacent rack and the means by which such engagements are maintained;

FIGURE 5 is a section taken along line 5—5 of FIGURE 1 to show another set of idler sprockets in the train and the mounting thereof, parts of the carrier and rack appearing in the generally similar section of FIGURE 4 having been omitted; and FIGURE 6 is a section taken along line 6—6 of FIGURE 1 to show the construction of the carrier at each of its ends and the antifriction means in the form of rollers or wheels carried thereby for coaction with the rack by which the mechanism is interconnected with and aligned to the rack at all times for virtually unrestricted relative linear movement.

Referring more particularly to the drawings, 10 designates a carrier adapted to be universally mounted to a relatively movable member, for example, by means of and through a ball joint 11 and link 12 at one end of and centrally of the carrier 10. At its other end the link 12 is similarly connected to a relatively stationary member (not shown).

The carrier 10 is hollow and constitutes a housing in which a pair of endless roller chains 13, each formed by three interconnected strands, is mounted. To this end, the opposite side walls of the carrier 10 are pierced adjacent their center by a pair of aligned, transverse openings adapted to mount antifriction devices such as roller bearings 14 in which the ends of a spindle 15 are rotatably mounted. At one end, the spindle 15 extends beyond the housing being adapted to connect in any conventional manner so as to mount and carry an appropriate prime mover such as, for example, motor 16 by which it is power driven. Mounted on the spindle 15 within the carrier 10 is a pair of sprockets 17 located side by side and separated one from the other by a spacer 18. The sprockets 17 thus disposed are appropriately secured to the spindle 15, for example, by a key connection 19, for rotation in unison therewith.

Also mounted on the carrier 10 and disposed on opposite sides of the spindle 15 are parallel spindles 20 and 21, each appropriately mounted at its ends in the side walls of the carrier 10 through bearings or the like to facilitate the free rotation thereof. In the case of the spindle 20, simple roller bearings like 14 may be employed. The spindle 21, however, passes through an oblong slot 10' in the side walls of the carrier 10 and is rotatably mounted in the ends of a plate 22 within a bushing 23, the sides of the plate 22 being slidably engaged within a pair of guide tracks 24 secured to the external surface of the carrier 10 by suitable fasteners 25. At their corresponding outer ends, the plates 22 are interconnected by a transverse connector 26 through which a set screw 27 operates to strike the associated end of carrier 10 and thereby adjusts the location of spindle 21 with respect to spindles 15 and 20.

The plates 22 together with their guide tracks 24 coact with head and nut means on the associated end of the spindle 21 to position and retain the bushings 23 and spindle 21 as well as to serve as a cover plate to exclude foreign matter from the interior of the carrier 10. Cover plates 15' and 20' associated with the spindles 15 and 20 respectively perform similar functions. Additionally, snap rings 15" and 20" may be employed in conventional manner to assist in this assembly.

Each of the spindles 20 and 21 mounts a pair of side-by-side sprockets 28 each mounted on a bearing 29 and separated one from another by a spacer 30 which also serves to cooperate with enlarged ends 31 on the bearings 29 and thereby maintain the sprockets 28 in a fixed plane of rotation. The sprockets 28 are all virtually identical each being formed with spaced rows of teeth 32 adapted to be disposed in the plane of and engage the corresponding outer strand of rollers of the chain 13. These sprockets 28 differ essentially from the sprockets 17 in that the sprockets 17 are each formed with three rows of teeth 33 disposed in the plane of and engaging the corresponding strand of rollers of the chain 13. Thus arranged the several sprockets 17 and 28 with the roller chains 13 installed constitute a train driven by the motor 16. This assembly is maintained at all times by the taut adjustment of the roller chains 13 through operation of the set screw 27.

In order to assure against the possibility of any binding or jamming of the idler sprockets 28 on the spindle 21, additional antifriction means in the form of grease may be employed. To facilitate this, an axial passage 41 may be provided in the spindle 21 with intersecting passages 42 that terminate at the periphery of the spindle 21 in the area of each bearing 29. At its outer end the passage 41 is adapted to mount a fitting 43 whereby grease is injected into passages 41 and 42 for ultimate delivery to the periphery of the spindle 21 where it acts on and against the adjacent surface of each bearing 29.

The axis of the drive spindle 15 is located slightly above the axes of the spindles 20 and 21 (FIGURE 1) so as to dispose its sprockets 17 in spaced relation to the adjacent edge of a rack 34 carried by the relatively movable member. This rack 34 is disposed substantially tangent to the sprocket teeth 32. The roller chains 13 passing along the sprockets 28 engage the teeth of the rack 34 when moving in one direction and the adjacent teeth 33 of the drive sprockets 17 when moving in the other direction. A shoe 35 is disposed between the intermediate portions of the roller chains 13 being secured to opposite side walls of the carrier 10 by pins 36. The outer surface of the shoe 35 is provided with runners 37 substantially in the same plane as the teeth 32 of sprockets 28 so as to engage the rollers of each outer strand of each chain 13. The shoe 35 thus acts to hold the middle strand of chain rollers of each chain 13 down into contact with the rack 34 which is formed with corresponding teeth 38 to receive such rollers and assure their constant engagement with the rack 34.

The carrier 10 is maintained in constant relative position with respect to the rack 34 by means of and through a set of wheels 39 at each of its ends. The carrier 10 as described is open at and along one of its sides adjacent the rack 34 and carries the wheels 39 which project therefrom for engagement with the rack 34. To this end, the carrier 10 is provided at opposite ends with a rigid transverse support 40 mounted between its side walls. One wheel 39 projects from the support 40 to be located at substantially the center of the carrier 10 in engagement with the adjacent surface of the rack 34. Projecting angularly from each side wall of the carrier 10 is another wheel 39 adapted to coact with a correspondingly angled surface of the rack 34 to impose a symmetrical force on the rack 34 in opposition to that imposed by the central wheel 39.

In view of the foregoing structure and arrangement with the outer end of the link 12 attached to a relatively stationary member, for example, and the rack 34 secured to a relatively movable member, operation of the motor 16 serves to drive the movable member with respect to the stationary member. The path of movement of the driven or movable member is established and maintained by the rack 34 which is constantly engaged by the carrier 10 through the roller chains 13 acting in conjunction with the wheels 39. Since this is the only connection between the relatively stationary and relatively movable members, the latter is free due to the swivel connection 11 to move laterally with respect to the former to eliminate jamming or binding thereof.

It is to be understood that this disclosure is directed to a preferred embodiment of the invention and numerous modifications may be made therein without departing from the true spirit and scope of the invention. The appended claims are intended to cover such modifications and alterations and to define the sole limitations of the invention.

What is claimed is:

1. A power transmission mechanism to interconnect a rotary and a linear device comprising a carrier mounting an endless chain formed by multiple strands of rollers, a pair of engagements carried by said carrier one operative between said rotary device and said chain and the other concurrently operative between said linear device and said chain, and a connection between one of said devices and relatively stationary structure whereby movement of said chain by said one device imparts relative movement to the other of said devices.

2. The mechanism of claim 1 wherein said connection is a swivel, said other device being adapted to be connected to another body.

3. The mechanism of claim 2 wherein said swivel includes a link of predetermined length connected adjacent one of its ends through a ball joint to said chain and adapted to be similarly connected at its other end to said stationary structure.

4. The mechanism of claim 1 wherein said rotary device includes at least one sprocket having teeth complemental to the rollers of at least one of said strands and said linear device includes a rack having teeth complemental to the rollers of each remaining strand to effect the engagement thereof as aforesaid.

5. The mechanism of claim 1 wherein said rotary device includes spaced, aligned sprockets each having teeth complemental to the rollers of at least one of said strands and said linear device includes a rack having teeth complemental to the rollers of each remaining strand, said mechanism further including a clamping engagement disposed between said sprockets and operative on said chain in opposition to said rack to maintain said rollers in constant engagement therewith.

6. The mechanism of claim 5 wherein said carrier substantially encloses said rotary device, and said other engagement includes wheels mounted on said carrier and disposed with their axes of rotation on opposite sides of said rack a distance substantially equal to their radii so as to locate their peripheries in contact with the adjacent surfaces of said rack.

7. The mechanism of claim 5 including an adjustment to regulate the distance between said sprockets.

8. The mechanism of claim 5 including runners carried by said clamping engagement for coaction with at least one strand of said rollers, said runners extending substantially the full length of the space between said sprockets.

9. The mechanism of claim 8 wherein said runners and said rack teeth engage alternate strands of said rollers.

10. The mechanism of claim 8 wherein said runners engage each strand of rollers in common with one of said devices and alternately with each strand of rollers engaged by the other said device.

References Cited

UNITED STATES PATENTS

| | | |
|---|---|---|
| 1,705,545 | 3/1929 | Seward. |
| 2,391,173 | 12/1945 | Loftus et al. |
| 2,869,379 | 1/1959 | Welser _____ 74—245 |

FRED C. MATTERN, JR., *Primary Examiner.*

LEONARD H. GERIN, *Assistant Examiner.*